(12) United States Patent
Jang et al.

(10) Patent No.: US 11,146,935 B2
(45) Date of Patent: Oct. 12, 2021

(54) SHORT RANGE WIRELESS COMMUNICATION DEVICE AND METHOD

(71) Applicant: SK Telecom Co., Ltd., Seoul (KR)

(72) Inventors: Byoungsoon Jang, Seoul (KR); Koo Yong Park, Seoul (KR); Hyo Jin Choi, Seoul (KR); Myung Soon Park, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 16/799,316

(22) Filed: Feb. 24, 2020

(65) Prior Publication Data

US 2020/0196124 A1 Jun. 18, 2020

Related U.S. Application Data

(63) Continuation of application No. PCT/KR2018/009660, filed on Aug. 22, 2018.

(30) Foreign Application Priority Data

Aug. 22, 2017 (KR) .................. 10-2017-0106301

(51) Int. Cl.
*H04W 4/80* (2018.01)
*H04B 7/204* (2006.01)
(Continued)

(52) U.S. Cl.
CPC ............... *H04W 4/80* (2018.02); *G06N 5/04* (2013.01); *G06N 20/00* (2019.01)

(58) Field of Classification Search
CPC ..... H04W 4/80; H04W 4/16; H04W 28/0263; H04B 1/405; H04B 7/2121;
(Continued)

(56) References Cited

U.S. PATENT DOCUMENTS 9,386,136 B2 * 7/2016 Barrett ............... H04M 1/6091
2009/0143011 A1 6/2009 Lee et al.
(Continued)

FOREIGN PATENT DOCUMENTS

KR 10-2009-0053282 A 5/2009
KR 10-2014-0055929 A 5/2014
(Continued)

OTHER PUBLICATIONS

PCT International Search Report, PCT Application No. PCT/KR2018/009660, dated Nov. 27, 2018, five pages.

*Primary Examiner* — Andrew Wendell
(74) *Attorney, Agent, or Firm* — Fenwick & West LLP

(57) ABSTRACT

A short-range wireless communications apparatus according to one embodiment includes a short-range wireless communications unit and a control unit. The short-range wireless communications unit is configured to communicate with a terminal device configured to provide a call service and a predetermined artificial intelligence service. The control unit configured to control the short-range wireless communications unit so that when the call service is provided, media data related to the call service is transmitted and received between the short-range wireless communications unit and the terminal device through a first channel, and when the artificial intelligence service is provided during the call service being provided, media data related to the artificial intelligence service is transmitted and received between the short-range wireless communications unit and the terminal device through a second channel separated from the first channel.

13 Claims, 7 Drawing Sheets

(51) Int. Cl.
*G06N 20/00* (2019.01)
*G06N 5/04* (2006.01)

(58) Field of Classification Search
CPC ............. H04L 65/1059; H04L 65/1089; H04L 65/4015; G06N 20/00; G06N 5/04
See application file for complete search history.

(56) References Cited

U.S. PATENT DOCUMENTS

| | | |
|---|---|---|
| 2011/0034126 A1 | 2/2011 | Higgins et al. |
| 2014/0371889 A1* | 12/2014 | Donaldson ....... H04N 21/41422 700/94 |
| 2015/0146683 A1* | 5/2015 | Cazanas .................. H04W 4/80 370/331 |
| 2016/0195856 A1* | 7/2016 | Spero ..................... G06N 5/046 700/90 |
| 2018/0054852 A1* | 2/2018 | Mohan .................. H04W 88/04 |
| 2018/0121859 A1* | 5/2018 | de Bold .................... G06N 5/04 |
| 2018/0160192 A1* | 6/2018 | Wu ..................... H04N 21/4856 |
| 2018/0316376 A1 | 11/2018 | Kim et al. |
| 2019/0037172 A1 | 1/2019 | Choi et al. |
| 2019/0042574 A1* | 2/2019 | Kim ...................... G06K 9/6254 |
| 2019/0295082 A1* | 9/2019 | Telem .................. G06Q 20/409 |
| 2020/0372063 A1* | 11/2020 | Sekar .................... G06F 16/438 |

FOREIGN PATENT DOCUMENTS

| | | |
|---|---|---|
| KR | 10-2017-0011763 A | 2/2017 |
| KR | 10-2017-0044963 A | 4/2017 |
| KR | 10-2017-0086869 A | 7/2017 |

\* cited by examiner

SHORT RANGE WIRELESS COMMUNICATION DEVICE AND METHOD

CROSS-REFERENCE TO RELATED APPLICATIONS

The application is a bypass continuation application of International PCT Application No. PCT/KR2018/009660 filed on Aug. 22, 2018, which claims priority to Republic of Korea Patent Application No. 10-2017-0106301 filed on Aug. 22, 2017, which are incorporated by reference herein in their entirety.

TECHNICAL FIELD

The disclosure relates to an apparatus and a method for a short-range wireless communications and a terminal apparatus. More particularly, the present invention pertains to a short-range wireless communications apparatus and method capable of, when a terminal device such as a smart device or the like make a call with a counterpart terminal device, controlling so that media data (voice or video) to be processed by the terminal device can be transmitted to and received from an external artificial intelligence service providing server.

BACKGROUND

Smart devices, such as smartphones or smart pads, provide a voice/video call function and a data communication function. In particular, a VoLTE service provides not only data communication but also voice/video calls through an LTE system. According to the VoLTE service, a user may share contents such as maps, music, news or photos with a counterpart in real time even during a voice/video call.

Recently, a server for providing an artificial intelligence service has emerged. Since the artificial intelligence service providing server has a learning function, it can provide a higher quality service as the number of uses thereof grows larger. A smart device may access the artificial intelligence service providing server by using data communication. A user may receive various services through the smart device. For example, the user may ask then artificial intelligence service providing server about weather or personal schedule through the smart device, may also query for more complicated and advanced information, and may be provided with a response therefor. In this case, the query may be in the form of voice or video, and the response therefor may also be in the form of voice or video.

The above-mentioned smart device may access the artificial intelligence service providing server through data communication using a separate application or the like even when a voice/video call is made. This enables the user to receive an artificial intelligence service even during the voice/video call.

However, when a voice/video call is being made, a technique of querying the artificial intelligence service providing server in the form of a voice command is not easy to implement. To this end, it is necessary to hook a voice or video inputted to the smart device and to deliver the hooked voice or video to a separate application instead of a phone application. However, such hooking can be implemented only at an operating system level, for example, an android framework level. That is, at a general application level, it is not easy to implement a technique of hooking a voice or video inputted to an input unit during a voice/video call and delivering the same to an artificial intelligence service providing server.

SUMMARY

Embodiments of the present invention provide a technique capable of, when a terminal device such as a smart device or the like make a call with a counterpart terminal device, controlling so that the media data (e.g., voice or video) inputted to the terminal device is transmitted to an external artificial intelligence service providing server or so that the media data transmitted from the artificial intelligence service providing server to the terminal device is provided to a user.

However, the embodiments of the present disclosure are not limited to those mentioned above. Other embodiments not mentioned may be clearly understood by those skilled in the art from the following description.

In accordance with an aspect of the present disclosure, there is provided a short-range wireless communications apparatus. The short-range wireless communications apparatus may include a short-range wireless communications unit configured to communicate with a terminal device configured to provide a call service and a predetermined artificial intelligence service and a control unit configured to control the short-range wireless communications unit so that when the call service is provided, media data related to the call service is transmitted and received between the short-range wireless communications unit and the terminal device through a first channel, and when the artificial intelligence service is provided during the call service being provided, media data related to the artificial intelligence service is transmitted and received between the short-range wireless communications unit and the terminal device through a second channel separated from the first channel.

In accordance with an aspect of the present disclosure, there is provided a short-range wireless communications method. The method may be performed by a short-range wireless communications apparatus connected to a terminal device configured to provide a call service and a predetermined artificial intelligence service in a short-range wireless communications manner. The method may include transmitting and receiving media data related to a call service through a first channel formed between the short-range wireless communications apparatus and the terminal device when the call service is provided; and transmitting and receiving media data corresponding to the artificial intelligence service through a second channel formed between the short-range wireless communications apparatus and the terminal device when the artificial intelligence service is provided during the call service being provided.

In accordance with an aspect of the present disclosure, there is provided a terminal device. The terminal device may include a wireless communications unit configured to communicate with a call processing network; a short-range wireless communications unit configured to communicate with a short-range wireless communications apparatus; and a control unit configured to control the short-range wireless communications unit so that media data related to a call service is transmitted and received between the short-range wireless communications unit and the short-range wireless communications apparatus through a first channel when the call service is provided through the call processing network, and control so that media data related to an artificial intelligence service is transmitted and received between the short-range wireless communications unit and the short-range wireless communications apparatus through a second channel separated from the first channel when the artificial intelligence service is provided during the call service being provided.

According to one embodiment, if a user requests an artificial intelligence service in the form of voice or video during a call service being provided, the request may be transmitted to the artificial intelligence service providing server through the terminal device. In addition, a response to such a request may also be provided to the user in the form of voice or video during a call.

In addition, the content of the request of the artificial intelligence service made by the user or the response to the request may be shared with a counterpart having the counterpart terminal device.

DETAILED DESCRIPTION

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of the functions of the embodiments of the present disclosure and may vary depending on a user's or an operator's intention or practice. Accordingly, the definition thereof may be made on a basis of the content throughout the specification.

First, the 'media data' referred to below may be a concept that encompasses a voice, a video and a data packet related thereto.

Figure 1:
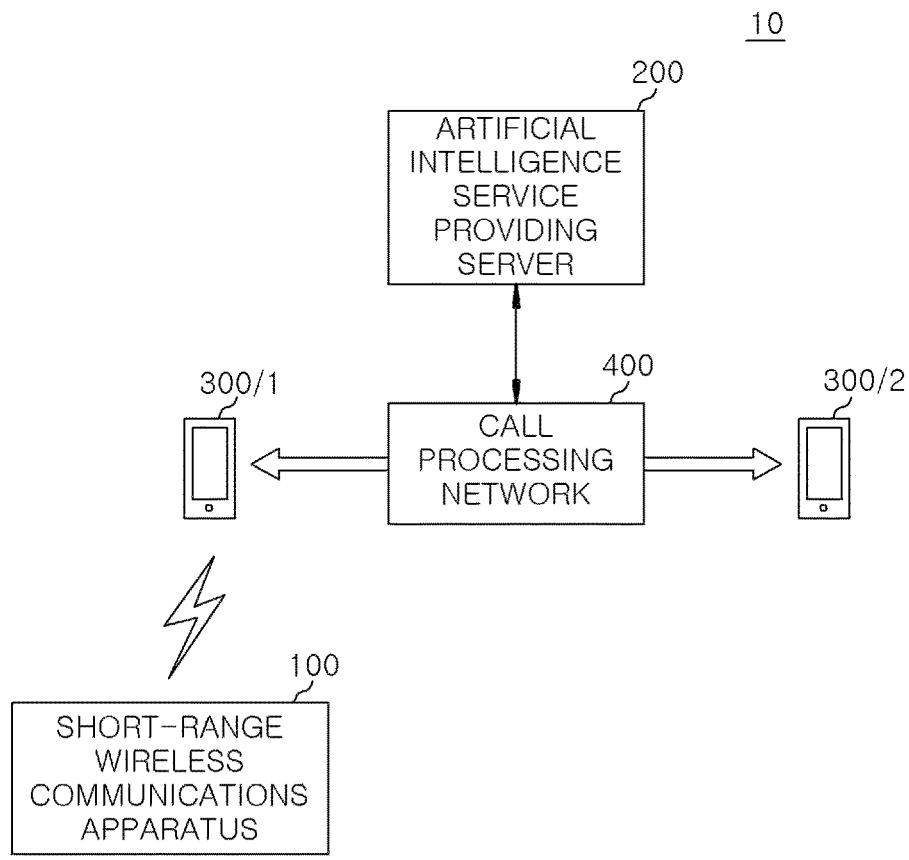
FIG. 1 is a view conceptually showing a mobile communication network to which a short-range wireless communications apparatus according to an embodiment is applied.

FIG. 1 is a view conceptually showing a mobile communication network to which a short-range wireless communications apparatus according to an embodiment is applied. However, FIG. 1 is merely exemplary. It should not be narrowly construed that the short-range wireless communications apparatus 100 is applied only to the mobile communication network 10 shown in FIG. 1.

Referring to FIG. 1, the mobile communication network 10 may include a short-range wireless communications apparatus 100, an artificial intelligence service providing server 200, first and second terminal devices 300/1 and 300/2, and a call processing network 400. The first terminal device 300/1 and the second terminal device 300/2 are examples of the terminals connected to the mobile communication network 10.

First, the artificial intelligence service providing server 200 is configured to provide an artificial intelligence service. The artificial intelligence service providing server 200 may be connected to various terminals or servers in addition to the terminal devices 300/1 and 300/2, and may provide various artificial intelligence services to each of them.

Figure 2:
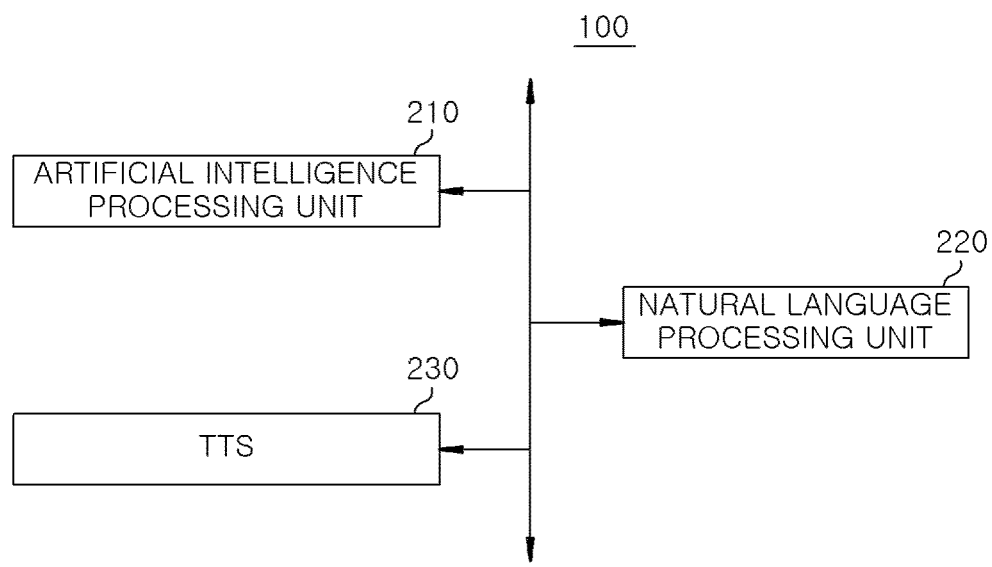
FIG. 2 is a view showing a configuration of an artificial intelligence service providing server shown in FIG. 1.

FIG. 2 is a view showing a configuration of the artificial intelligence service providing server 200. Referring to FIG. 2, the artificial intelligence service providing server 200 may include an artificial intelligence processing unit (intelligence workflow: IWF) 210 for performing artificial intelligence processing, a natural language processing unit (natural language understand) 220 for processing a natural language, or a voice synthesis unit (text-to-speech: TTS) module 230 for performing voice synthesis. In addition, the artificial intelligence service providing server 200 may be formed as a server group consisting of a plurality of servers.

Referring back to FIG. 1, the call processing network 400 is a communication network to which the terminal devices 300/1 and 300/2 are connected. Although not shown in the drawings, the call processing network 400 may include an intelligent network and a legacy call processing network. Such a legacy call processing network may include an LTE packet network. However, the present invention is not limited to such a configuration.

The intelligent network may be, for example, an IP multimedia subsystem (IMS) which may be defined as an intelligent network node. The legacy call processing network may refer to a mobile communication network such as, for example, a WCDMA or the like. In addition, the LTE packet network may be, for example, an LTE mobile communication network. Each of the intelligent network, the legacy call processing network and the LTE packet network may have the same configuration as that of a known network. Thus, the detailed description of each of these networks will be omitted.

Each of the terminal devices 300/1 and 300/2 may be located in one (or two or more) cells among a plurality of cells included the call processing network 400 to receive data services such as a voice/video call or an artificial intelligence service. The terminal devices 300/1 and 300/2 may be implemented in various forms such as smart phones, smart pads or tablet pads.

If any one of the terminal devices 300/1 and 300/2 shown in FIG. 1 is assumed to be a transmitting terminal, the other terminal device may be a receiving terminal. These terminal devices will be described in more detail with reference to FIG. 3.

Figure 3:
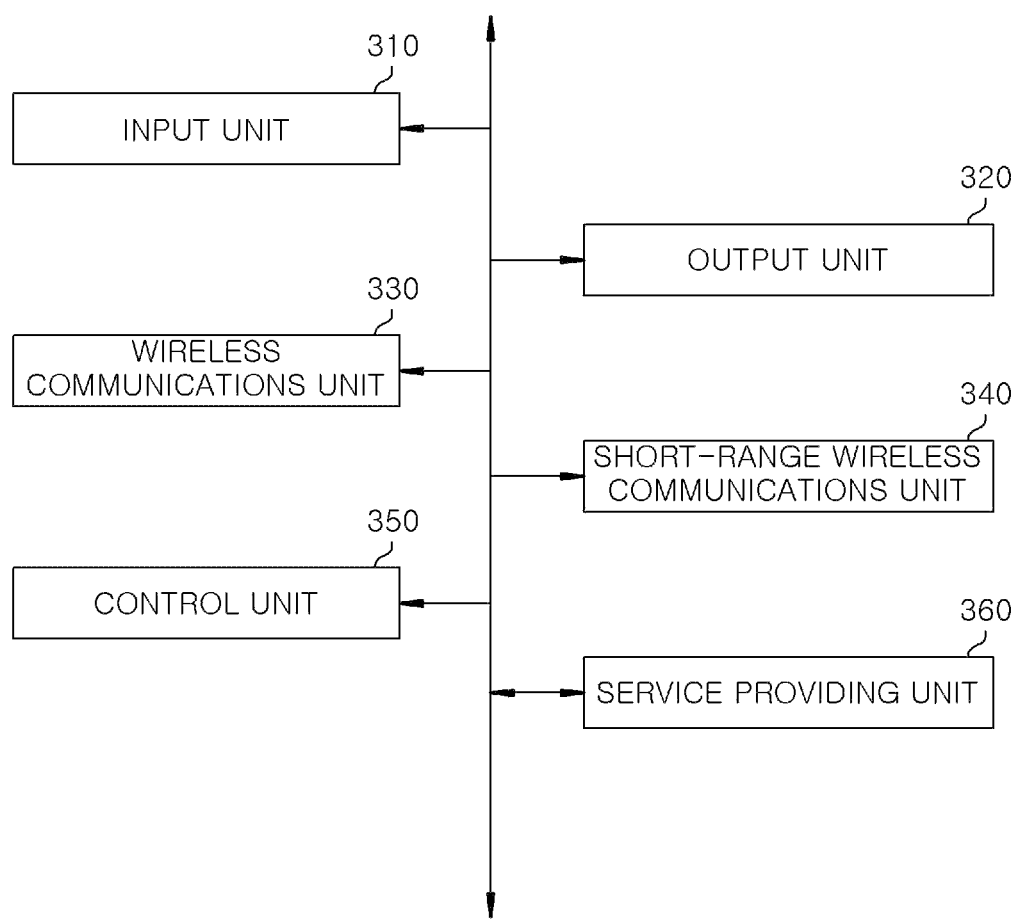
FIG. 3 is a view showing a configuration of a terminal device shown in FIG. 1.

FIG. 3 is a view showing a configuration of the terminal device 300/1 shown in FIG. 1. The following description may be similarly applied to the terminal device 300/2.

Referring to FIG. 3, the terminal device 300/1 includes an input unit 310, an output unit 320, a wireless communications unit 330, a short-range wireless communications unit 340, a control unit 350, and a service providing unit 360. However, in some embodiments, at least one of these components may be excluded, or a component not referred to here may be further included.

The input unit 310 is configured to receive media data from a user of the terminal device 300/1, and may refer to, for example, a microphone, a camera, or a module including both the microphone and the camera.

The output unit 320 is configured to output media data to the user of the terminal device 300/1, and may refer to, for example, a speaker, a display such as an LCD or the like, or a module including both the speaker and the display.

The wireless communications unit 330 is configured to transmit and receive media data to and from the call processing network 400. The wireless communications unit 330 may include a wireless module such as 3G, 4G, LTE-A or the like.

The short-range wireless communications unit 340 is configured to perform short-range wireless communications. The short-range wireless communications unit 340 may include at least one of a Bluetooth module, a radio frequency identification (RFID) module, an infrared communication module, an ultra-wide band (UWB) module and a Zigbee module. However, the short-range wireless communications unit 340 is not limited thereto. Hereinafter, description will be made on the premise that the short-range wireless communications unit 340 includes a Bluetooth module.

Each of the control unit 350 and the service providing unit 360 may be implemented by a memory for storing instructions programmed to perform a function to be described below, and a microprocessor for executing the instructions.

Figure 4:
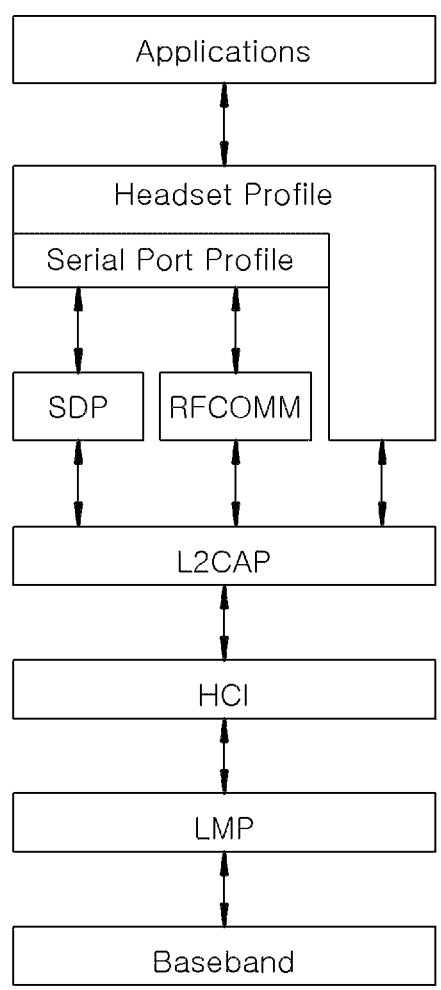
FIG. 4 is a view showing a stack of a Bluetooth protocol.

A Bluetooth protocol stack is implemented in the control unit 350 in software. FIG. 4 is a view conceptually showing a Bluetooth protocol stack implemented in the control unit 350. However, in some embodiments, the Bluetooth protocol stack may be implemented in the short-range wireless communications unit 340 instead of the control unit 350, or may be divisionally implemented in both the control unit 350 and the short-range wireless communications unit 340.

Referring to FIG. 4, the Bluetooth protocol stack may include a predetermined hierarchical structure. For example, the Bluetooth protocol stack may include a baseband, a link manager protocol (LMP), a host controller interface (HCI), a logical link control and adaptation protocol (L2CAP), a radio frequency communication (RFCOMM), a service discovery protocol (SDP), a headset profile (HPF), and applications. Among them, the HPF may include a serial port profile (SPP).

Among them, the baseband is a physical layer connection management protocol and plays a role of error recovery, logical channel management, frequency hopping algorithm, security or the like. The LMP is a protocol for handling link establishment between Bluetooth devices, and provides link control services such as an automatic retransmission request for requesting retransmission upon receiving a faulty baseband packet, a forward error correction for making it possible to track and correct the number of bit errors in the data, and the like. The HCI refers to a standard interface between a host and a host controller in a Bluetooth system. The L2CAP performs multiplexing to distinguish higher layers, such as RFCOMM or SDP, segments large packets used at the higher layers into sizes usable in the baseband layers, or recombines packets used in the multiple baseband layers into packets having sizes usable in the higher layers. The RFCOMM is a protocol for emulating a serial port and is the most basic protocol for making wireless an existing RS-232 cable. The SDP is a protocol for exchanging information about what services are available in the connected Bluetooth device and the characteristics of the available services. The HPF is a protocol that defines characteristics and procedures for ensuring interoperability between Bluetooth headset devices.

The control unit 350 is involved in a procedure for generating a channel to be used for transmitting and receiving media data. In more detail, the control unit 350 may generate a first channel and a second channel by cooperating with the control unit 150 of the below-described short-range wireless communications apparatus 100 based on the above-described Bluetooth protocol stack. First, the first channel will be described. The first channel serves as a path that connects the short-range wireless communications unit 340 and the short-range wireless communications apparatus 100 (the short-range wireless communications module 130 included in the short-range wireless communications apparatus 100) so that media data can be transmitted therebetween. The first channel may be formed according to the RFCOMM protocol based on the HPF.

The first channel does not support an error correction function. In addition, only one first channel may be generated or maintained between the short-range wireless communications apparatus 100 and the terminal device 300/1. This first channel may be referred to as synchronous connection-oriented (SCO) channel.

Alternatively, the second channel may be formed according to the RFCOMM protocol based on an RFCOMM interface (not shown). The second channel also serves as a path that connects the short-range wireless communications unit 340 and the short-range wireless communications apparatus 100 (the short-range wireless communications module 130 included in the short-range wireless communications apparatus 100) so that media data can be transmitted therebetween.

The second channel supports an error correction function (i.e., a retransmission function). In addition, a plurality of second channels may be generated or maintained between devices. In the L2CAP layer, the plurality of second channels may be divided into individual IDs through MUX/DEMUX.

Meanwhile, the control unit 350 controls the short-range wireless communications unit 340 such that media data is transmitted and received through either the first channel or the second channel. In this case, the control unit 350 cooperates with the control unit 150 of the short-range wireless communications apparatus 100 to execute such control.

Specifically, the control unit 350 allows media data such as a voice call or a video call to be transmitted and received between the short-range wireless communications apparatus 100 and the terminal device 300/1 through the first channel.

Describing the delivery path of the voice call or the video call, for example, the media data received by the short-range wireless communications unit 340 from the short-range wireless communications apparatus 100 through the first channel is delivered to an application (phone application) for processing a call (video call or voice call) through the aforementioned RFCOMM and HPF implemented in the control unit 350. Then, the media data is delivered to the call processing network 400 through the wireless communications unit 330.

In contrast, the control unit 350 controls such that the media data transmitted to and received from the artificial intelligence service providing server 200 shown in FIG. 1 is transmitted and received between the short-range communication apparatus 100 and the terminal device 300/1 through the second channel. Control to transmit and receive between the devices (300/1). Describing the delivery path of the media data, for example, the service request data received by the short-range wireless communications unit 340 from the short-range wireless communications apparatus 100 through the second channel is delivered to the artificial intelligence service providing server 200 through the wireless communications unit 330 via the above-described RFCOMM implemented in the control unit 350 (without going through the HPF).

That is, in one embodiment, the channel (first channel) used for transmitting and receiving media data constituting a call and the channel (second channel) used for transmitting and receiving data other than a call, for example, media data corresponding to an artificial intelligence service, exist separately from each other. Meanwhile, the service providing unit 360 is configured to autonomously provide various artificial intelligence services in response to a request from a user of the terminal device 300/1. For example, the service providing unit 360 may provide a service for autonomously deriving content, which may be most preferred by the user, based on a usage pattern of the terminal device 300/1 recognized by the user of the terminal device 300/1. In addition, the service providing unit 360 may provide a service or response corresponding to the request of the user based on the information that can be autonomously obtained by the terminal device 300/1. However, in some embodiments, such a service providing unit 360 may not be included in the terminal device 300/1.

Figure 5:
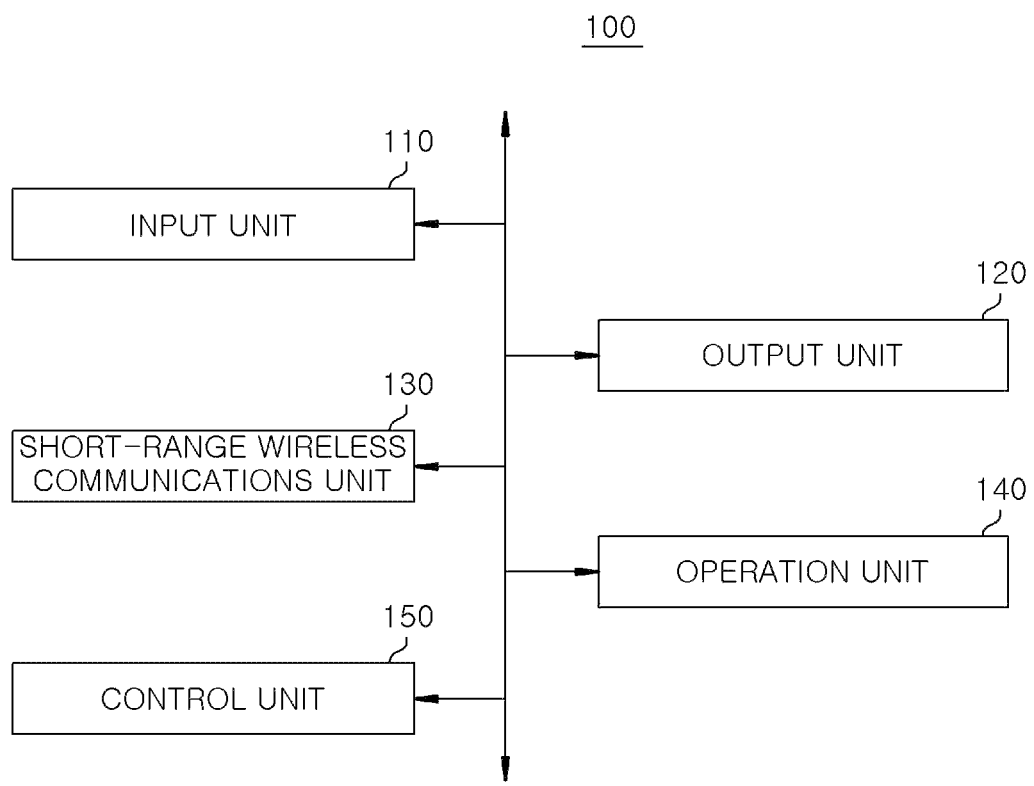
FIG. 5 is a view showing a configuration of the short-range wireless communications apparatus shown in FIG. 1.

FIG. 5 is a view showing a configuration of the short-range wireless communications apparatus 100 shown in FIG. 1. First, the short-range wireless communications apparatus 100 may be a headset device connected to the terminal device 300/1 in a short-range wireless communications manner. However, the present invention is not limited thereto.

Referring to FIG. 5, the short-range wireless communications apparatus 100 includes an input unit 110, an output unit 120, a short-range wireless communications unit 130, an operation unit 140 and a control unit 150. However, FIG. 5 is nothing more than an example. Therefore, the short-range wireless communications apparatus 100 is not limited to the example shown in FIG. 5.

The input unit 110 is a component that receives media data from a user of the terminal device 300/1, and may refer to a microphone, a camera or a module including both the microphone and camera. The input unit 110 may be connected to the short-range wireless communications unit 130 to receive media data from the terminal device 300/1. In this case, the input unit 110 may mix the media data received from the user and the media data delivered from the short-range wireless communications unit 130. To this end, the input unit 110 may include a mixing module for mixing different kinds of media data.

The output unit 120 is a component that outputs media data to a user of the terminal device 300/1. The output unit 120 may refer to, for example, a speaker, a display such as an LCD or the like, or a module including both the speaker and the display. The output unit 120 may be connected to the short-range wireless communications unit 130 to receive media data therefrom, and may mix the media data and output the media data to the user. To this end, the output unit 120 may include a mixing module for mixing different kinds of media data.

The short-range wireless communications unit 130 is a component for performing short-range wireless communications. The short-range wireless communications unit 130 may include at least one of a Bluetooth module, a radio frequency identification (RFID) module, an infrared communication module, an ultra-wide band (UWB) module and a Zigbee module. However, the present invention is not limited thereto. Hereinafter, description will be made on the premise that the short-range wireless communications unit 130 includes a Bluetooth module.

The operation unit 140 is a component for receiving a request for a predefined operation from the user. To this end, the operation unit 140 includes a component that can be touched or pressed. The operation unit 140 may be configured to transmit a signal to the below-described control unit 150 when it is touched or pressed. For example, the operation unit 140 may be implemented by long pressing a specific button assigned to the basic protocol of Bluetooth (long button), or may be implemented through a button assigned separately.

The control unit 150 may include a storage unit for storing instructions programmed to perform a function to be described below, and a microprocessor for executing the instructions.

The control unit 150 is involved in generating a channel to be used for transmitting and receiving media data between the short-range wireless communications unit 340 of the terminal device 300/1 and the short-range wireless communications unit 130 of the short-range wireless communications apparatus 100.

In more detail, the control unit 150 may generate the aforementioned first channel and the aforementioned second channel by cooperating with the control unit 350 of the terminal device 300/1 based on the above-described Bluetooth protocol stack. As described above, media data such as a voice call or a video call is transmitted and received through the first channel. In contrast, media data transmitted to and received from the artificial intelligence service providing server 200 shown in FIG. 1 or the like is transmitted and received through the second channel. Hereinafter, the data transmitted and received through the first channel will be referred to as first media data, and the data transmitted and received through the second channel will be referred to as second media data.

First media data may include, for example, a voice or video call transmitted and received between the user of the terminal device 300/1 and the user of the counterpart terminal device 300/2.

Alternatively, second media data may include, for example, a substantial matter (e.g., an inquiry about weather or an inquiry about a personal schedule) on an artificial intelligence service requested by the user of the terminal device 300/1 to the artificial intelligence service providing server 200, or a substantial content responded by the artificial intelligence service providing server 200 to the user of the terminal device 300/1 in response to such a request. However, the present invention is not limited thereto.

Meanwhile, in some embodiments, the first media data, i.e., the data transmitted and received through the first channel, may include is a mixture of the 'inter-user call content' and the 'response from the artificial intelligence service providing server 200', i.e., 'mixing data'. This will be described later.

Figure 6:
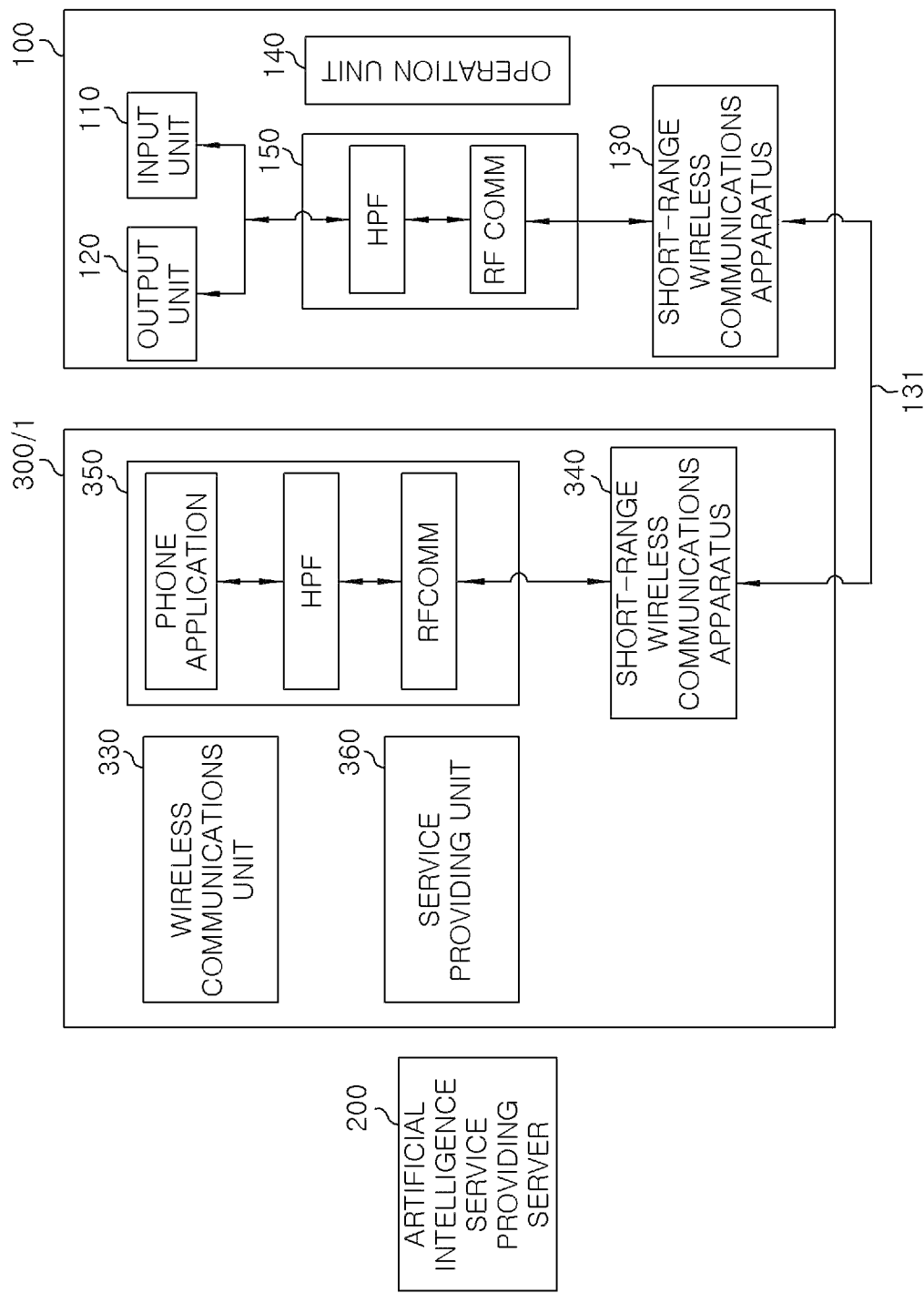
FIG. 6 is a view showing a process of making a voice/video call when the short-range wireless communications apparatus according to the embodiment is connected to the terminal device.

FIG. 6 shows a state in which a first channel is formed between the short-range wireless communications unit 340 of the terminal device 300/1 and the wireless communications unit 130 of the short-range wireless communications apparatus 100 under the cooperation of the control unit 150 with the control unit 350 of the terminal device 300/1.

As described above, the first channel 131 is a channel formed according to the RFCOMM protocol based on the HPF. The content of a call between the terminal device 300/1 and the counterpart terminal device 300/2 is transmitted and received between the short-range wireless communications unit 130 and the short-range wireless communications unit 340 through the first channel 131. In more detail, the media data inputted to the input unit 110 of the short-range wireless communications apparatus 100 is delivered to the short-range wireless communications unit 130 through the HPF and the RFCOMM implemented in the control unit 150, and is delivered from the short-range wireless communications unit 130 to the short-range wireless communications unit 340 through the first channel 131. As described above, the media data delivered to the short-range wireless communications unit 340 is delivered to the application for processing a call (video call or voice call) through the RFCOMM and the HPF, and then delivered to the call processing network 400 through the wireless communications unit 330.

Figure 7:
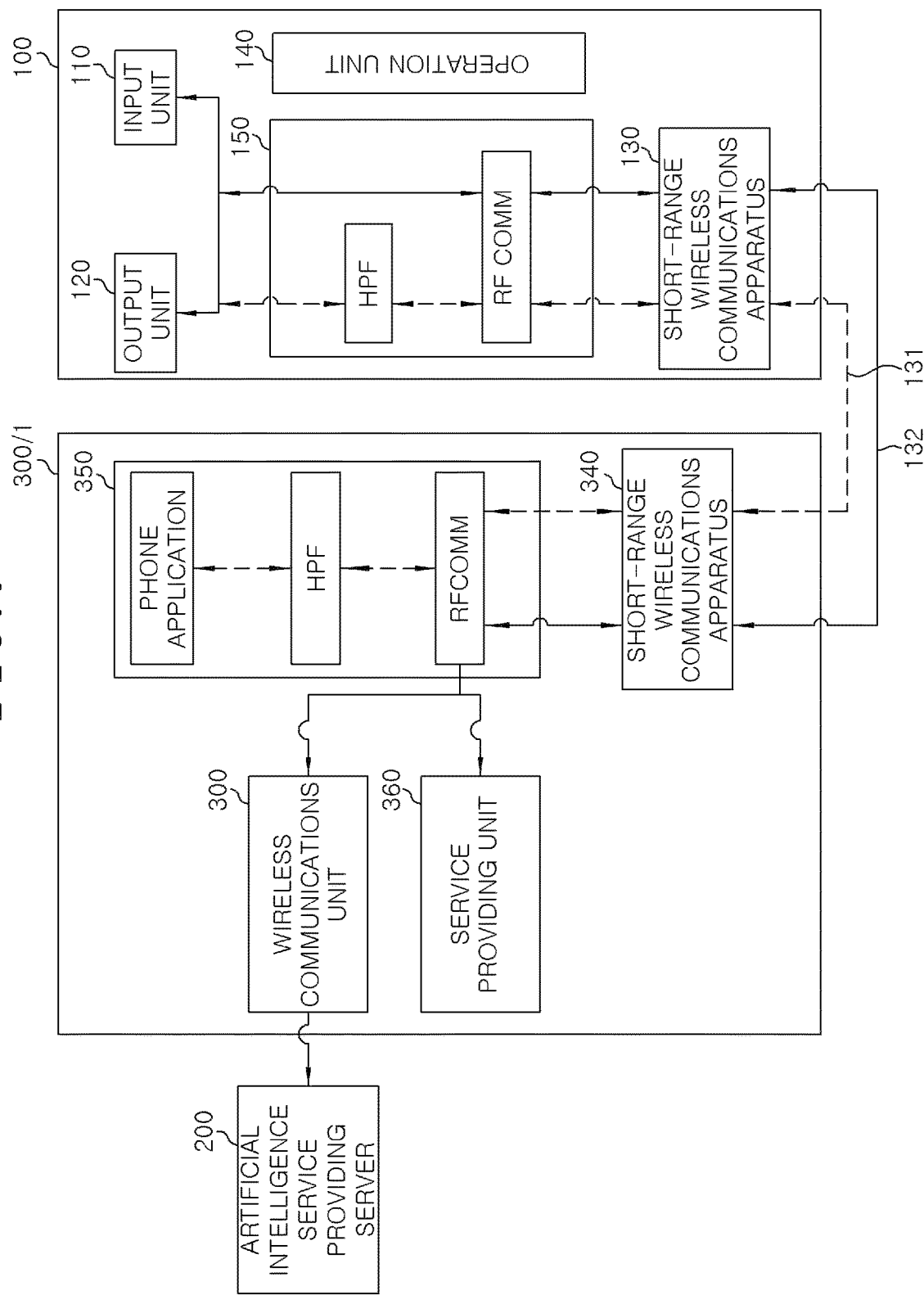
FIG. 7 is a view showing a process of exchanging media data with the artificial intelligence service providing server when the short-range wireless communications apparatus according to the embodiment is connected to the terminal device.

In contrast, FIG. 7 shows a state in which a second channel is formed between the short-range wireless communications unit 340 of the terminal device 300/1 and the wireless communications unit 130 of the short-range wireless communications apparatus 100 under the cooperation of the control unit 150 with the control unit 350 of the terminal device 300/1.

As described above, the second channel 132 is a channel formed according to the RFCOMM protocol based on an RFCOMM interface (not shown). The matter requested by the terminal device 300/1 to the artificial intelligence service providing server 200 or the content responded by the artificial intelligence service providing server 200 in response to such a request is transmitted and received between the short-range wireless communications unit 130 and the short-range wireless communications unit 340 through the second channel 132. In more detail, the request inputted to the input unit 110 of the short-range wireless communications apparatus 100 is delivered to the short-range wireless communications unit 130 through the RFCOMM implemented in the control unit 150 (not through the HPF), and delivered from the short-range wireless communications unit 130 to the short-range wireless communications unit 340 through the second channel 132. As described above, the media data delivered to the short-range wireless communications unit 340 is delivered to the artificial intelligence service providing server 200 through the RFCOMM (not through HPF) via the wireless communications unit 330. In this case, in some embodiments, the first channel 131 may coexist with the second channel 132. The first channel 131 is indicated by a dotted line in FIG. 7. That is, in one embodiment, the channel (first channel) used for transmitting and receiving data constituting a call and the channel (second channel) used for transmitting and receiving data other than a call, for example, data corresponding to an artificial intelligence service, exist separately from each other.

Meanwhile, the second channel 132 may be formed by the control unit 150 when a request for a predefined operation is made through the operation unit 140. In more detail, when a signal is inputted to the control unit 150 by touching or pressing the operation unit 140 during a call, the control unit 150 may enter a formation procedure of the second channel 132 based on the RFCOMM interface. As an example of the formation procedure, the control unit 150 may perform an initiating operation for forming a new channel with respect to the RFCOMM protocol, and then may perform an operation for mixing at the input unit 110 and the output unit 120 (e.g., buffer allocation for mixing media data).

Comparing the first channel 131 and the second channel 132, the first media data delivered through the first channel 131 passes through the HPF. By the way, this HPF is system level software. That is, in order to hook the media data transmitted and received through the first channel 131 by correcting the HPF which is the basis of the first channel 131, a user or a developer should be able to make correction at an operating system (OS) level, for example, an android framework level. Thus, such correction is not easy to implement.

On the other hand, the second media data delivered through the second channel 132 makes use of the RFCOMM interface. Such RFCOMM interface provides a communication API in the form of socket read/write at an android framework. Therefore, it is relatively easy for the user or developer to correct the second channel 132 using this RFCOMM interface than to correct the first channel 131.

That is, according to one embodiment, in order to provide a voice or video of the user to the artificial intelligence service providing server 200 during a call, the second channel 132 corresponding to the RFCOMM protocol may be formed based on the RFCOMM interface instead of hooking the first channel 131. In this case, the voice or video of the user during the call may be more easily provided to the artificial intelligence service providing server 200. In addition, the response to the request may also be provided to the user in the form of voice or video during the call.

Meanwhile, the control unit 150 may controls so that after the second channel 132 is formed, the voice or video inputted through the input unit 110 is not delivered to the terminal device 300/1 through the first channel 131. Accordingly, the user of the terminal device 300/1 may cause the user of the counterpart terminal device 300/2 not to know what kind of request the user of the terminal device 300/1 has made. Alternatively, the control unit 150 may control so that even after the second channel 132 is formed, the voice or video inputted through the input unit 110 is delivered to the terminal device 300/1 through not only the second channel 132 but also the first channel 131. In this case, the user of the counterpart terminal device 300/2 may recognize what kind of request the user of the terminal device 300/1 has made.

On the other hand, the control unit 150 may control so that different kinds of media data are mixed in each of the input unit 110 and the output unit 120. For example, if a response to the service request is received as second media data from the artificial intelligence service providing server 200 through the second channel 132 after the second channel 132 is formed, the control unit 150 may control so that the response to the service request is delivered to the input unit 110. In addition, the control unit 150 may control the input unit 110 such that the media data delivered to the input unit 110 in this way is mixed with the media data received from the user in the input unit 110. When the input unit 110 performs mixing under such control, the control unit 150 may control so that the mixed media data is transmitted to the terminal device 300/1 through the first channel 131.

That is, according to one embodiment, the response to the request for the artificial intelligence service made by the user may be mixed with the voice or video of the user and transmitted to the counterpart.

Meanwhile, in the above-described embodiment, the first media data and the second media data are mixed in the short-range wireless communications apparatus 100. However, the spirit of the present invention is not limited thereto.

For example, in some embodiments, the mixing may be performed in the terminal device 300/1 or the artificial intelligence service providing server 200.

Figure 8:
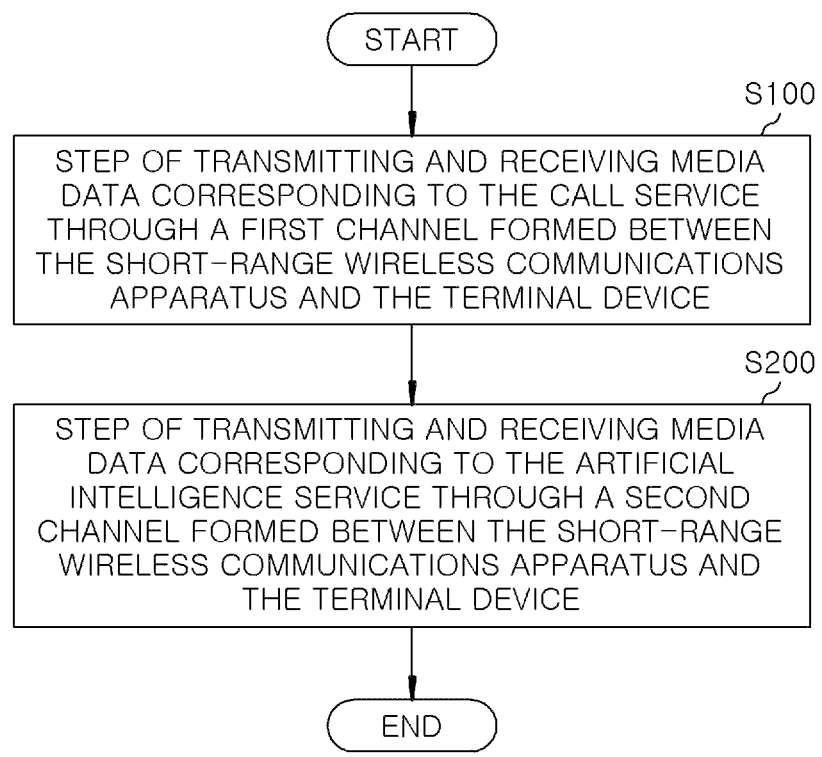
FIG. 8 is a view showing steps of a short-range wireless communications method according to an embodiment.

FIG. 8 is a view showing steps of a short-range wireless communications method according to an embodiment. The method shown in FIG. 8 may be performed by the short-range wireless communications apparatus 100 shown in FIG. 5. The method shown in FIG. 8 is merely exemplary. At least one of the steps shown in FIG. 8 may not be performed, or the steps shown in FIG. 8 may be performed in an order different from the order of the illustrated steps. In addition, other steps not shown may be performed.

Prior to referring to FIG. 8, it should be noted that the short-range wireless communications apparatus 100 is connected to the terminal device 300/1, which provides a call service or a predetermined artificial intelligence service, in a short-range wireless communications manner.

Referring to FIG. 8, the short-range wireless communications method includes a step of transmitting and receiving media data corresponding to the call service through a first channel formed between the short-range wireless communications apparatus and the terminal device (S100), and a step of transmitting and receiving media data corresponding to the artificial intelligence service through a second channel formed between the short-range wireless communications apparatus and the terminal device (S200).

Meanwhile, such a short-range wireless communications method is performed by the short-range wireless communications apparatus 100 described above. The substantial content of the short-range wireless communications method is the same as that of the short-range wireless communications apparatus 100. Therefore, the above description is incorporated here as the description of the short-range wireless communications method.

As described above, according to one embodiment, if a user requests an artificial intelligence service in the form of voice or video during a call, the request may be transmitted to the artificial intelligence service providing server through the terminal device. In addition, a response to such a request may also be provided to the user in the form of voice or video during a call.

In addition, the content of the request of the artificial intelligence service made by the user or the response to the request may be shared with a counterpart.

Meanwhile, as shown in FIG. 3, the terminal device 300/1 may further include a service providing unit 360 as a component thereof. The service providing unit 360 is configured to autonomously provide various artificial intelligence services in response to a request from a user of the terminal device 300/1. For example, the service providing unit 360 may provide a service for autonomously deriving content, which may be most preferred by the user, based on a usage pattern of the terminal device 300/1 recognized by the user of the terminal device 300/1. In addition, the service providing unit 360 may provide a service or response corresponding to the request of the user based on the information that can be autonomously obtained by the terminal device 300/1.

In this case, even when the user of the terminal device 300/1 requests the service providing unit 360 to provide an artificial intelligence service and even when a predetermined service is provided by the service providing unit 360 in response to the request, the spirit of the present invention described in one embodiment is applicable. For example, when a user who is making a call to the counterpart terminal device 300/2 using the terminal device 300/1 requests the service providing unit 360 of the terminal device 300/1 to provide a predetermined service, the service providing unit 360 may provide a predetermined service to the user in response to the request. In this case, the content of the service requested to the service providing unit 360 and the content of the service provided by the service providing unit 360 as a response may be transmitted and received through the aforementioned second channel formed between the short-range wireless communications apparatus 100 and the terminal device 300/1.

Meanwhile, in the above-described embodiment, the second channel is formed 'during in the call'. However, the spirit of the present invention is not limited thereto. For example, the spirit of the present invention may include an embodiment in which the above-described second channel is formed and the media data is transmitted and received even when a predetermined medium is being played in the terminal device 300/1 or a predetermined application is being executed in the terminal device 300/1.

The above description illustrates the technical idea of the present disclosure, and it will be understood by those skilled in the art to which this present disclosure belongs that various changes and modifications may be made without departing from the scope of the essential characteristics of the present disclosure. Therefore, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure.

According to one embodiment, if a user requests an artificial intelligence service in the form of voice or video during a call, the request may be transmitted to the artificial intelligence service providing server through the terminal device. In addition, a response to such a request may also be provided to the user in the form of voice or video during a call.

In addition, the content of the request of the artificial intelligence service made by the user or the response to the request may be shared with a counterpart.

What is claimed is:

1. A short-range wireless communications apparatus, comprising:
   a short-range wireless communications unit configured to communicate with a first terminal device of a first user to provide a call service between the first terminal device and a second terminal device of a second user, and further configured to communicate with a predetermined artificial intelligence service; and
   a control unit configured to control the short-range wireless communications unit so that when the call service is provided, media data related to the call service between the first terminal device of the first user and the second terminal device of the second user is transmitted and received between the short-range wireless communications unit and the first terminal device through a first channel between the short-range wireless communications apparatus and the first terminal device, and when the artificial intelligence service is provided during the call service being provided, a second channel is formed between the short-range wireless communications apparatus and the first terminal device and media data related to the artificial intelligence service is transmitted and received through the second channel separated from the first channel, and wherein the predetermined artificial intelligence service is provided upon receiving a predetermined form of input from the first user.

2. The apparatus of claim 1, wherein the predetermined form of input includes a voice input and a touch input, wherein the apparatus further includes an operation unit configured to receive the touch input from the first user of the first terminal device, wherein the control unit, when receiving the input from the first user through the operation unit, recognizes that the artificial intelligence service is to be provided during the call service being provided, generates the second channel and then control the short-range wireless communications unit so that the media data related to the artificial intelligence service is transmitted and received through the second channel.

3. The apparatus of claim 2, wherein the second channel is generated according to a RFCOMM protocol based on a RFCOMM interface.

4. The apparatus of claim 1, wherein the control unit is configured to control the short-range wireless communications unit so that the media data transmitted and received through the first channel is transmitted and received by using a headset profile of the short-range wireless communications apparatus, and control the short-range wireless communications unit so that the media data transmitted and received through the second channel is transmitted and received without using the headset profile of the short-range wireless communications apparatus.

5. The apparatus of claim 1, wherein the media data transmitted and received through the first channel is transmitted and received via a call processing server for providing the call service, and the media data transmitted and received through the second channel is transmitted and received via an artificial intelligence service providing server for providing the artificial intelligence service or a service providing unit included in the terminal device.

6. The apparatus of claim 1, wherein the media data transmitted from the short-range wireless communications unit to the first terminal device through the second channel includes media data destined for an external artificial intelligence service providing server or a service providing unit included in the first terminal device, and the media data received from the first terminal device by the short-range wireless communications unit through the second channel includes media data received from the artificial intelligence service providing server by the first terminal device or media data provided by the service providing unit.

7. The apparatus of claim 1, wherein the control unit controls the short-range wireless communications unit so that the media data received by the short-range wireless communications unit through the second channel is transmitted from the short-range wireless communications unit to the first terminal device through the first channel.

8. The apparatus of claim 1, further comprising:

an input unit configured to receive media data from the first user, wherein the control unit is configured to control the short-range wireless communications unit so that the media data received by the short-range wireless communications unit through the second channel is mixed with the media data inputted from the first user through the input unit during the call service being provided and is transmitted from the short-range wireless communications unit to the first terminal device through the first channel.

9. A method of performing short-range wireless communications by a short-range wireless communications apparatus connected to a first terminal device of a first user to provide a call service between the first terminal device and a second terminal device of a second user, and further configured to communicate with a predetermined artificial intelligence service in a short-range wireless communications manner, comprising:

transmitting and receiving media data related to a call service between the first terminal device of the first user and the second terminal device of the second user through a first channel formed between the short-range wireless communications apparatus and the first terminal device when the call service is provided; and transmitting and receiving media data corresponding to the artificial intelligence service through a second channel formed between the short-range wireless communications apparatus and the first terminal device when the artificial intelligence service is provided during the call service being provided, wherein the predetermined artificial intelligence service is provided upon receiving a predetermined form of input from the first user.

10. A terminal device, comprising:

a wireless communications unit configured to communicate with a call processing network;

a short-range wireless communications unit configured to communicate with a short-range wireless communications apparatus;

a control unit configured to control the short-range wireless communications unit so that media data related to a call service between the terminal device of a first user and another terminal device of a second user is transmitted and received between the short-range wireless communications unit and the short-range wireless communications apparatus through a first channel when the call service between the terminal device of the first user and the other terminal device of the second user is provided through the call processing network, and control so that media data related to an artificial intelligence service is transmitted and received between the short-range wireless communications unit and the short-range wireless communications apparatus through a second channel formed between the short-range wireless communications apparatus and the terminal device when the artificial intelligence service is provided during the call service being provided, the second channel separated from the first channel when the artificial intelligence service, and wherein the artificial intelligence service is provided upon receiving a predetermined form of input from the first user.

11. The device of claim 10, wherein the control unit is configured to execute control so that the media data transmitted and received through the first channel is transmitted and received by using a headset profile of the terminal device, and execute control so that the media data transmitted and received through the second channel is transmitted and received without using the headset profile of the terminal device.

12. The device of claim 10, wherein the media data transmitted from the short-range wireless communications unit to the short-range wireless communications apparatus through the second channel is received by the wireless communications unit from an external artificial intelligence service providing server.

13. The device of claim 10, further comprising:
a service providing unit configured to provide the artificial intelligence service, wherein the media data transmitted from the short-range wireless communications unit to the short-range wireless communications apparatus through the second channel is provided by the service providing unit.

* * * * *